Patented June 10, 1952

2,599,986

UNITED STATES PATENT OFFICE 2,599,986

PREPARATION OF HOMOGENEOUS MIXTURE OF ASPHALT AND POLYSTYRENE

Johannes Goebel and Pieter Bakker, Amsterdam, and Jelle Gerrit Hoogland, Hengelo, Netherlands, assignors to Shell Development Company, Emeryville, Calif., a corporation of Delaware No Drawing. Application August 1, 1947, Serial No. 765,650. In the Netherlands January 7, 1944

Section 1, Public Law 690, August 8, 1946
Patent expires January 7, 1964

5 Claims. (Cl. 260—28.5)

This invention relates to the preparation of mixtures of bituminous materials, such as asphalts, and polystyrene.

The preparation of bituminous compositions which have plastic (as opposed to fluid) properties at relatively high temperatures has been investigated for a number of years. It has been proposed previously to add high molecular weight hydrocarbons, both natural and synthetic, to bitumens in substantial amounts in order to accomplish this purpose. Rubberized asphalts are an improvement over the original asphalt, with respect to their temperature susceptibility and elasticity. While rubberized asphalts have proven to be valuable additions to road-building and roofing materials, they have the disadvantage that they tend to break down upon heating.

Asphalts containing 5% or more natural rubber are extremely viscous above their melting points, and in order to properly mix them with mineral aggregate they frequently must be heated to temperatures at which natural rubber decomposes to a considerable degree, whereby a good deal of the advantage gained by the addition of rubber is destroyed. Natural rubber in hydrocarbon solution decomposes at an appreciable rate at temperatures as low as 200° F., the rate of decomposition rapidly increasing with further increases in temperature. Moreover, asphalts containing natural rubber have a tendency to deteriorate rather rapidly, possibly because of the instability of the latter, which often has a detrimental effect on the lasting properties of pavements and the like made from such rubber-containing asphaltic compositions.

It has been previously found that certain synthetic hydrocarbon polymers could be used in place of natural rubber in asphalt compositions, with the added advantage that the compositions thus formed had a somewhat higher thermal stability than did asphalt-natural rubber compositions. While a certain advantage was gained by the replacement of natural rubber with synthetic hydrocarbon polymers, disadvantages were apparent in the resulting compositions. The most serious of these was a lack of homogeneity, as evidenced by its stringy appearance and its poor adhesion to wood, metal, stone, and like surfaces. In preparing these compositions it was believed necessary to dissolve all of the components in a solvent, such as kerosene, naphtha, gas oil, etc. or to add the polymers to a molten asphalt. In either case, as stated, the resulting compositions were non-homogeneous and had poor adhesion characteristics.

It is an object of this invention to provide bituminous compositions having improved properties. It is another object of this invention to provide a process for improving compositions comprising a bitumen and polystyrene. It is a particular object of this invention to improve the homogeneity and adhesion characteristics of such compositions. Other objects will become evident in the following discussion.

Now, in accordance with this invention, it has been found that the homogeneity and adhesion characteristics of bituminous compositions containing polystyrene may be substantially improved by heating them for a relatively short time to a temperature within the range of from about 250° C. to about 325° C. Further, still in accordance with this invention, when such heated compositions are cooled, they may be readily ground into a finely commuted form which easily dissolves to form a bituminous paint of substantial hardness, good adhesion and improved stability.

The proportion of polystyrene present in the composition will vary with the purpose for which it is intended. If it is merely desired to improve the adhesion characteristics of a bitumen, as little as 1% by weight of the polymer, based on the total composition may be used, although from about 2% to about 5% give the most satisfactory improvement in adhesion characteristics without greatly changing the other properties of the bitumen. If a harder composition is desired, having plastic rather than fluid properties at relatively high temperatures, the composition may contain as much as 60% polymer, and 40% bitumen. Such compositions, especially those containing from about 10% to about 40% polymer, have excellent adhesion properties and at the same time the composition is tough and not subject to scratching or marring when used as a coating.

According to the process of the present invention the mixture of bitumen and polystyrene has been found to be substantially improved in quality by heating within the critical temperature range. If the mixture is heated below 250° C. the resulting composition lacks the necessary homogeneity and adhesion characteristics. If the maximum temperature of 325° C. is exceeded the polymer, for some unknown reason, again becomes incompatible with the bitumen and gradually separates therefrom.

The reason for the beneficial result obtained within this relatively narrow temperature range is obscure. It seems reasonable to theorize that the polymer in some way becomes compatible with the bitumen, possibly by a certain amount of reaction therewith. However, the present invention is not to be limited to this theory since all that is certain is that heating within the prescribed temperance range gives a highly beneficial result.

The time of heating required to obtain an entirely homogeneous product will vary with the temperature, the identity of the polymer and of the bitumen, and the molecular weight of the polymer. Ordinarily the heating period will vary from about 30 minutes to 8 hours, but about 1–3 hours give optimum results in most cases.

As pointed out hereinbefore, these improved compositions may be used in molten form or may be cooled, crushed and dissolved in a solvent; the solution to be used as a cut-back, or in thinner form as a lacquer. If the composition contains more than about 10% of a polystyrene the latter method is preferred. Other materials may be incorporated in the composition, such as fillers, including graphite, quartz powder, slate powder, kieselguhr, etc.; or aggregate, including both basic stone (limestone) or acidic stone (granite).

Compositions containing fillers may be used for the application of protective coatings which are unaffected by corrosive chemicals and moreover have improved mechanical strength. The compositions prepared according to the present invention are pre-eminently suitable for the manufacture of protective coatings on reservoirs, reaction vessels, pipes and the like. They are particularly valuable for the protection of equipment used in chemical and electrochemical industries, especially if such equipment is subject to the deleterious action of acids, bases or gases.

The following example is inserted to illustrate the process of the present invention:

A blown asphalt (penetration at 25° C.=15, ring and ball melting point 115° C.) was melted. Finely ground polystyrene (molecular weight about 25,000) was added to give a mixture containing 60 parts of asphalt and 40 parts of polystyrene. The mixture was heated in the course of one hour to 300° C. As heating continued during this period it was apparent that the two substances gradually became miscible with one another, and eventually a homogeneous mass was formed. The latter was cooled, ground and mixed with an equal quantity of solvent naphtha and applied as a thick paint to a steel plate. After evaporation of the solvent, a stamp with a surface of 1 sq. cm. was placed on the coating for 20 hours under 1 kg. pressure at 80° C. No impression had been made in the coating at the end of this time.

We claim as our invention:

1. In the preparation of an asphalt composition suitable for use as a scratch resistant surface coating, the step comprising heating a composition consisting essentially of 60 parts of a melted blown bituminous asphalt and 40 parts by weight of polystyrene for one hour at 300° C., the resulting product being homogeneous in character.

2. In the preparation of homogeneous scratch resistant compositions, the step comprising heating a mixture consisting essentially of 10–60% by weight of polystyrene and 40–90% by weight of melted bituminous asphalt for a period of 0.5–8 hours at a temperature of 250°–325° C., the time and temperature of said heating being sufficient to insure homogeneity.

3. In the preparation of an asphalt composition suitable for use as a scratch-resistant coating, the step comprising heating a composition consisting essentially of 60 parts by weight of a melted blown bituminous asphalt and 40 parts by weight of polystyrene having a molecular weight of about 25,000 for about one hour at about 300° C., to produce a product homogeneous in character, exhibiting no phase separation and, when cooled, having improved surface coating properties of substantial hardness, good adhesion and improved stability.

4. In the preparation of homogeneous scratch resistant compositions, the step comprising heating a mixture consisting essentially of 10–60% by weight of polystyrene and 40–90% by weight of melted blown bituminous asphalt for a period of 0.5–8 hours at a temperature of 250°–325° C., the time and temperature of said heating being sufficient to insure homogeneity.

5. In the preparation of homogeneous scratch resistant compositions, the step comprising heating a mixture consisting essentially of 10–60% by weight of polystyrene and 40–90% by weight of melted bituminous asphalt for a period of 1–3 hours at a temperature of 250°–325° C., the time and temperature of said heating being sufficient to insure homogeneity.

JOHANNES GOEBEL.
PIETER BAKKER.
JELLE GERRIT HOOGLAND.

REFERENCES CITED

The following references are of record in the file of this patent:

UNITED STATES PATENTS

| Number | Name | Date |
| --- | --- | --- |
| 2,197,461 | Anderson et al. | Apr. 16, 1940 |
| 2,322,886 | Saunders et al. | June 29, 1943 |
| 2,418,135 | Moore et al. | Apr. 1, 1947 |
| 2,485,625 | Merley et al. | Oct. 25, 1949 |

OTHER REFERENCES

Evans et al.: Industrial & Eng. Chemistry, vol. 35, #4 (April 1943), pp. 481–488.

Abraham: Asphalt and Allied Substances, 4th ed., 1938, page 73.